March 21, 1967
R. C. MAXSON
3,309,769
HEDGE TRIMMER HAVING A RECIPROCATING SAW
Filed March 22, 1965
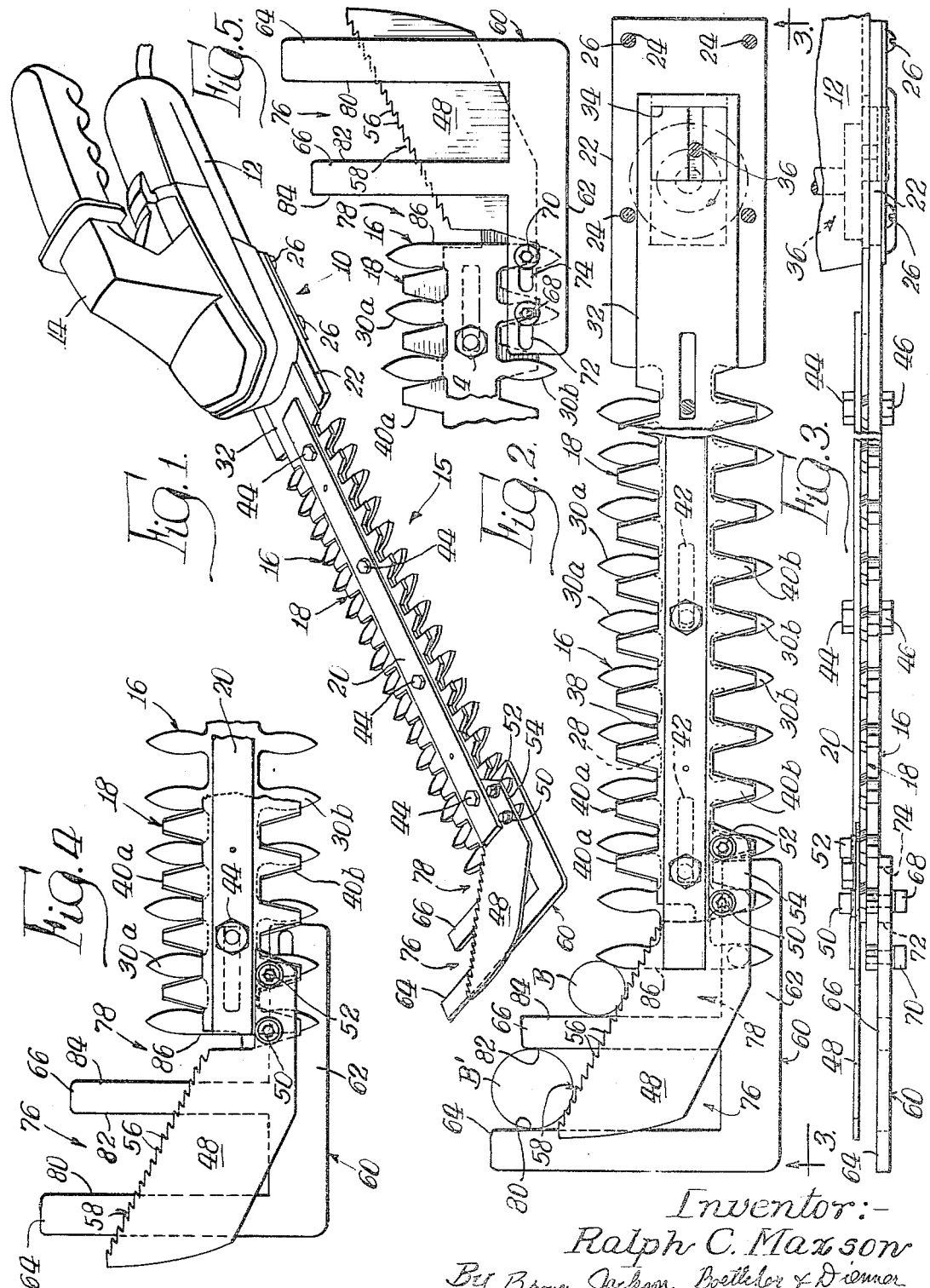
Inventor:-
Ralph C. Maxson
By Brown, Jackson, Boettcher & Dienner
Attys.

United States Patent Office 3,309,769
Patented Mar. 21, 1967

3,309,769
HEDGE TRIMMER HAVING A RECIPROCATING SAW
Ralph C. Maxson, Skokie, Ill., assignor to Vermont American Corporation, Louisville, Ky., a corporation of Kentucky
Filed Mar. 22, 1965, Ser. No. 441,694
1 Claim. (Cl. 30—144)

The present invention relates to a hedge trimmer of the type having a fixed cutting blade and a movable cutting blade together with drive means for longitudinally reciprocating the movable blade relative to the fixed blade. More specifically, the invention relates to a hedge trimmer of the foregoing type which further embodies an added saw blade and associated branch support member for cutting branches which are too large to be severed by the cooperative action of the fixed and movable cutting blades.

It is well known in the art to provide a hedge trimmer having a fixed blade with cutting teeth spaced along a longitudinal edge thereof and a movable blade having cutting teeth spaced along a longitudinal edge thereof, together with drive means such as an electric motor for reciprocating the movable blade longitudinally relative to the fixed blade to perform a cutting operation. Such hedge trimmers are efficient in the trimming of hedges, provided none of the branches to be cut exceeds approximately 0.375 inch in diameter. However, conventional hedge trimmers cannot be utilized efficiently in the cutting of branches which exceed 0.375 inch in diameter, even though it is common to encounter branches up to 0.75 inch in many instances.

Accordingly, it is an object of the present invention to provide a hedge trimmer embodying a saw blade and associated branch support member for cutting branches which are too large to be severed by conventional cutting blades or the like.

In furtherance of the foregoing object, there is provided a hedge trimmer having a fixed cutting blade and a movable cutting blade, together with drive means for longitudinally reciprocating the movable blade relative to the fixed blade. Each of the two blades has a plurality of cutting teeth spaced along one longitudinal edge thereof, and while in the embodiment described herein each blade has cutting teeth on both of its longitudinal edges, the present invention is by no means limited to the latter arrangement. A saw blade member is mounted on or integral with the outer end of the movable cutting blade so as to reciprocate therewith, and the saw blade is positioned so that its cutting edge is inclined relative to the longitudinal axis of the movable blade on which it is carried. In addition, a branch supporting member is mounted on or integral with the outer end of the fixed blade so as to be disposed alongside the saw blade and thereby support a branch which is to be severed by the saw blade member. The branch supporting member comprises at least one slot or the like for receiving and supporting a branch which is to be severed by the saw blade, and, apart from the inclination of the saw blade, the slot opens generally in the direction which the teeth on the saw blade face. Accordingly, as the hedge trimmer is positioned to cause a branch to be moved into the slot provided by the branch supporting member, the branch as it moves into the slot engages the saw blade and is severed thereby.

The foregoing and other objects and advantages of the invention will be apparent from the following description thereof.

Now in order to acquaint those skilled in the art with the manner of utilizing and practicing my invention, I shall describe, in conjunction with the accompanying drawings, a preferred embodiment of the invention.

In the drawings:

FIGURE 1 is a perspective view of a hedge trimmer embodying a saw blade and associated branch support member constructed in accordance with the present invention;

FIGURE 2 is an enlarged top plan view, partly broken away, of the cutting blade assembly embodied in the hedge trimmer of FIGURE 1, the movable cutting blade being shown proximate the inner end of its stroke;

FIGURE 3 is a side elevational view of the blade assembly looking approximately in the direction of the arrows 3—3 of FIGURE 2;

FIGURE 4 is a fragmentary top plan view of the outer end of the blade assembly of FIGURE 2 showing the movable cutting blade and attached saw blade proximate the outer end of their stroke; and FIGURE 5 is a fragmentary bottom plan view showing the manner in which the branch support member is adjustably secured to the end of the fixed cutting blade.

Referring now to the drawings, FIGURE 1 shows an electric hedge trimmer 10 comprising a motor housing 12, a handle 14 integral with the motor housing, and a cutting blade assembly 15. The cutting blade assembly 15 includes a fixed blade 16, a movable blade 18, and a longitudinal support plate 20. As shown in FIGURE 2, the fixed blade 16 includes a mounting plate portion 22 at its inner end with openings 24 to accommodate four mounting screws 26 (see FIGURE 3) which secure the rear end of the fixed blade to the underside of the housing 12. The blade 16 comprises a base portion 28 having a plurality of cutting teeth 30a projecting from one side thereof and a plurality of cutting teeth 30b projecting from the opposite side thereof.

The movable blade 18 includes a plate portion 32 at its inner end having a square opening 34 therein for cooperation with drive mechanism indicated at 36 for longitudinally reciprocating the blade 18 relative to the fixed blade 16. The blade 18 comprises a base portion 38 having a plurality of cutting teeth 40a projecting from one side thereof and a plurality of cutting teeth 40b projecting from the opposite side thereof. The movable blade 18 overlies the fixed blade 16 and is provided with a plurality of longitudinal slots as shown at 42 in FIGURE 2. In the embodiment being described, four such longitudinal slots are provided, and four bolts 44 and nuts 46 are utilized to secure the movable blade 18 between the support plate 20 and the fixed blade 16, the bolts being disposed in the slots 42. Thus, each bolt 44 passes through the longitudinal support plate 20, through one of the slots 42 in the movable blade 18, and through the fixed blade 16, and a nut 46 is secured to the bolt at the underside of the fixed blade 16 as shown in FIGURE 3. The slots 42 permit the movable blade 18 to reciprocate longitudinally between the support plate 20 and the fixed blade 16, and of course the blade assembly 15 must not be clamped so tight as to prevent the reciprocating movement of the blade 18. It should be noted that a blade assembly comprising the fixed blade 16 and movable blade 18 is covered in my copending application Ser. No. 441,763, filed Mar. 22, 1965.

A saw blade 48 is secured to the outer end of the movable blade 16 by a pair of mounting screws 50 and 52 which extend through a tail portion 54 of the blade 48 and are threaded into the outermost two teeth 40b on the movable cutting blade 18. The saw blade 48 is provided with a plurality of saw teeth 56 comprising a saw cutting edge 58 which in the embodiment shown defines an angle of about 30 degrees relative to the longitudinal axis of the blade assembly 15. The purpose of the inclined saw blade 48 is to sever branches which are too large to be cut by the fixed cutting blade 16 and movable cutting blade 18. It should be understood that while in the embodiment described herein the saw blade 48 is removably secured to the movable cutting blade 18 by the screws 50 and 52, the saw blade may if desired be secured by other suitable fastening means or may be integral with the outer end of the blade 18.

In order to support a branch which is to be severed by the saw blade 48, there is provided an F-shaped branch support member 60 having a base 62, and a pair of depending legs 64 and 66 which extend from the base generally perpendicular to the longitudinal axis of the blade assembly 15 and project beyond the saw cutting edge 58. FIGURE 5 shows the manner in which the branch support member 60 is secured to the outer end of the fixed cutting blade 16 by a pair of screw fasteners 68 and 70. The screws 68 and 70 extend through corresponding longitudinal slots 72 and 74 formed in the base 62 of the support 60 and such screws are threaded into the outermost two cutting teeth 30b of the fixed cutting blade 16. It will be noted that limited longitudinal adjustment of the position of the branch support 60 is permitted by the slots 72 and 74 formed therein. The branch support member 60 is disposed alongside the saw blade 48 and is adjacent thereto as best shown in FIGURE 3.

The branch support member 60 defines a pair of branch slots 76 and 78 for receiving and supporting branches such as shown at B and B′ in FIGURE 2. Thus, the slot 76 is defined by an inner wall 80 on the leg 64 and an outer wall 82 on the leg 66, and the slot 78 is defined by an inner wall 84 on the leg 66 and by an outer end surface 86 of the fixed cutting blade 16. In the embodiment illustrated in the drawings the outer slot 76 has a width of 0.75 inch, and the inner slot has a width of 0.500 inch. However, it will be understood that the width of of the branch slot 78 can be varied due to the provision of the screw slots 72 and 74 in the support member 60.

While the saw blade 48 and branch support 60 have been illustrated in conjunction with a blade assembly 15 having a double cutting edge, it is important to understand that the present invention is entirely suitable for use with a hedge trimmer having a blade assembly with a single cutting edge. In the latter instance, the components would be mounted with the operative sides of the saw blade 48 and support 60 on the same side of the hedge trimmer 10 as the cutting edge of the blade assembly 15. For example, with the saw blade 48 and support 60 mounted as shown in FIGURE 2, the cutting teeth 30b on the fixed blade 16 could be eliminated, and the cutting teeth 40b on the movable blade 18 could be eliminated. Alternatively, a guard (not shown) may be provided to cover the teeth 30b and 40b when the saw blade 48 is being used.

In operation, branches which cannot be properly cut by the fixed cutting blade 16 and movable cutting blade 18, such as branches exceeding approximately 0.375 inch in diameter, are severed by the saw blade 48. Such cutting of large branches is accomplished by positioning the hedge trimmer 10 so as to dispose the branch in one of the slots 76 or 78 depending upon the size of the branch. Thus, assuming the branch support 80 is adjusted to a position where the branch slot 78 has a width of 0.500 inch, then branches too large to be cut by the blades 16 and 18 but not in excess of 0.500 inch in diameter are severed by the saw blade 48 by causing such a branch to be positioned in the slot 78 as shown at B in FIGURE 2. The branch is thus cut by the saw blade 48 while supported between the walls 84 and 86. It should be noted that FIGURE 2 shows the inclined blade 48 at the rearward end of its stroke, and the slot 78 is greater in depth when the saw blade 48 is at the forward end of its stroke as shown in FIGURE 4.

If a branch is too large to fit within the branch slot 78, but does not exceed 0.75 inch in diameter, then such a branch may be positioned in the slot 76 as shown at B′ in FIGURE 2 and thereby severed by the saw blade 48 while supported between the walls 80 and 82. The device of the present invention is quite simple to use since it is only necessary to align the branch to be cut with one of the slots 76 and 78 and then move the saw blade 48 and support 60 toward the branch to position the branch in one of the slots thereby causing it to engage the cutting edge 58 of the reciprocating saw blade once the branch has entered the slot.

The depending leg 64 of the branch support 60 is somewhat longer than the depending leg 66 due to the inclination of the saw blade 48, the object being to provide branch slots of comparable depth. The saw blade 48 is positioned so that its cutting edge 58 extends outwardly and laterally at an angle to the longitudinally axis of the blade assembly 15. The purpose of providing such an angle is to permit the saw blade 48 to bite into a branch during the inward stroke of the blade, i.e., as the blade moves to the right as viewed in FIGURE 2. In the embodiment shown in the drawings, the saw blade 48 defines an angle of about 30 degrees with respect to the longitudinal axis of the blade assembly 15, and with such an arrangement very little cutting of the branch occurs during the outward stroke of the blade 48. However, it is important to understand that various other angles may be used and excellent results have been obtained by positioning the saw blade 48 at an angle of approximately 7 to 10 degrees relative to the longitudinal axis of the blade assembly 15. With the latter arrangement, appreciable cutting action can be obtained during the outward stroke of the saw blade 48, even though the major portion of the cutting action still occurs during the inward stroke of the blade. It is not desirable to arrange the saw blade 48 with its cutting edge 58 parallel to the longitudinal axis of the blade assembly 15 since with such an arrangement the blade does not properly bite into a branch disposed in one of the slots 76 and 78.

The foregoing description is intended to illustrate only one embodiment of my invention. Therefore, while I have illustrated my invention in a preferred form, I do not intended to be limited to that form, except insofar as the appended claim is so limited, since modifications coming within the scope of my invention will be readily suggested to others with my disclosure before them.

I claim:

In a hedge trimmer or the like of the type having a first fixed cutting blade with a plurality of cutting teeth spaced along a longitudinal edge thereof, a second movable cutting blade having a plurality of cutting teeth spaced along a longitudinal edge thereof, and drive means for reciprocating the movable blade along a longitudinal path relative to the fixed blade to effect cutting of relatively small branches, the improvement comprising, in combination, a saw blade carried on the outer end of said movable blade for reciprocation therewith to effect cutting of relatively large branches, said saw blade having a toothed cutting edge inclined to said longitudinal path of movement of said movable blade, and a generally F-shaped branch support member having a base portion carried on the outer end of said fixed blade and having a pair of longitudinally spaced depending legs which are adjacent said saw blade in side-by-side relation thereto and which together with the end of said fixed blade define a pair of longitudinally spaced branch-receiving slots both of which open in a direction generally perpendicular to said longitudinal path of movement of said movable blade and which are generally traversed by said saw blade in such a manner that when a branch to be cut is moved into one of said slots said branch will engage against said toothed cutting edge of said saw blade while supported in said slot, one of said slots being wider than the other to accommodate branches of varying sizes, and said F-shaped branch support member being longitudinally adjustable to vary the width of the innermost one of said pair of slots.

References Cited by the Examiner

UNITED STATES PATENTS

| | | | |
|---|---|---|---|
| 802,290 | 10/1905 | Holmes | 30—166 |
| 2,563,264 | 8/1951 | Norgard | 30—166 |
| 3,143,798 | 8/1964 | Lundquist | 30—144 X |
| 3,217,408 | 11/1965 | Jepson et al. | 30—144 |

WILLIAM FELDMAN, *Primary Examiner.*

G. WEIDENFELD, *Assistant Examiner.*